United States Patent [19]

Bezek

[11] Patent Number: 5,390,260
[45] Date of Patent: Feb. 14, 1995

[54] METHOD AND APPARATUS FOR ON-LINE, REAL TIME RECOGNITION OF STROKED HAND-DRAWN CHARACTERS

[75] Inventor: John D. Bezek, Owego, N.Y.

[73] Assignee: International Business Machines, Corp., Armonk, N.Y.

[21] Appl. No.: 84,658

[22] Filed: Jun. 28, 1993

[51] Int. Cl.[6] .............................................. G06K 9/00
[52] U.S. Cl. ............................................ 382/13; 382/3
[58] Field of Search .................................. 382/13, 2, 3

[56] References Cited

U.S. PATENT DOCUMENTS

| | | | |
|---|---|---|---|
| 4,404,653 | 9/1983 | Ruhman et al. | 365/49 |
| 4,972,496 | 11/1990 | Sklarew | 382/13 |
| 5,014,327 | 5/1991 | Potter et al. | 382/14 |
| 5,113,452 | 5/1992 | Chatani et al. | 382/13 |
| 5,157,737 | 10/1992 | Sklarew | 382/13 |

OTHER PUBLICATIONS

Guoqing et al, "Multilayer parallel distributed pattern recognition system . . . ", 144–146, Mar. 1992.

*Primary Examiner*—Leo H. Boudreau
*Assistant Examiner*—Christopher S. Kelley
*Attorney, Agent, or Firm*—Richard M. Goldman

[57] ABSTRACT

Disclosed is a method and multiprocessor apparatus to convert an alphanumeric input into input to an application program as a text processing or word processing program. This is accomplished in a computer having relative motion and/or relative position sensing input capability and a content addressable memory including a comparand register, tag fields, data fields, and a match circuit. The method continuously determines when the relative motion and/or relative position sensing input is active. When the input is active the system senses a basic attribute myotion and/or position of the active relative motion and/or relative position sensing input and defines a meta attribute of the sensed input. Exemplary meta attributes include the turns, weighted input center, and stroke geometry and topology. The meta-attribute is continuously updated and formed into an updated multi-bit input object attribute word of the sensed basic attributes and defined meta attributes of the sensed input for storage in the comparand register. This multi-bit word stored in the comparand register is compared to the recognition pattern tag field entries in the content addressable memory, and matches an output from the content addressable memory. This output is the contents of the content addressable memory data field having a recognition pattern tag field entry most closely corresponding to the multi-bit input object attribute word. Also disclosed is a multi-processor system for carrying out the method of the invention.

4 Claims, 8 Drawing Sheets

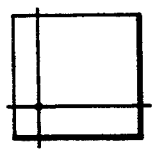 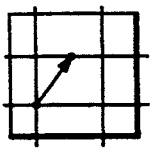 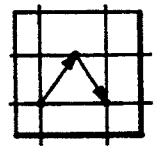 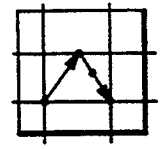 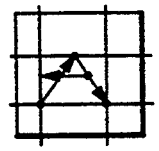
FIG.5(a)   FIG.5(b)   FIG.5(c)   FIG.5(d)   FIG.5(e)
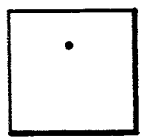 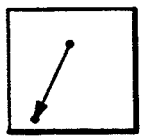 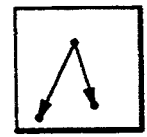 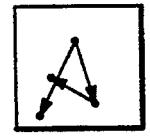 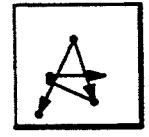
FIG.6(a)   FIG.6(b)   FIG.6(c)   NO "PEN-UP" FIG.6(d)   FIG.6(e)
PEN DOWN & START POINT    TURN
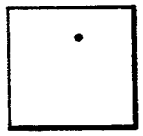 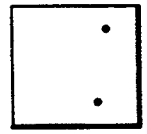
STOP POINT & PEN UP
TURN
FIG.7(a)   FIG.7(b)
START POINT (TWICE)
PAUSE 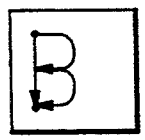
STOP POINT (TWICE)
FIG.8(a)
 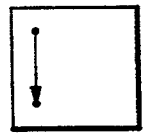 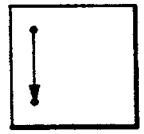 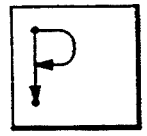 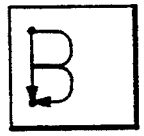
FIG.8(b)   FIG.8(c)   FIG.8(d)   FIG.8(e)   FIG.8(f)

 
FIG.9(a)  FIG.9(b)
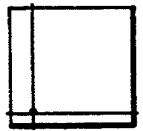 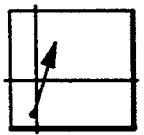 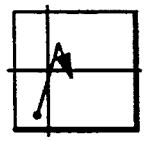 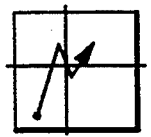 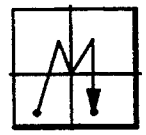
FIG.9(c)  FIG.9(d)  FIG.9(e)  FIG.9(f)  FIG.9(g)
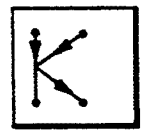
FIG.10(a)
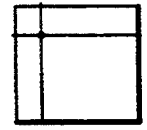 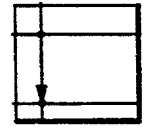 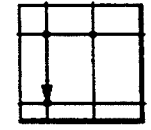 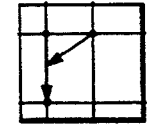 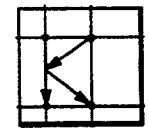
FIG.10(b)  FIG.10(c)  FIG.10(d)  FIG.10(e)  FIG.10(f)
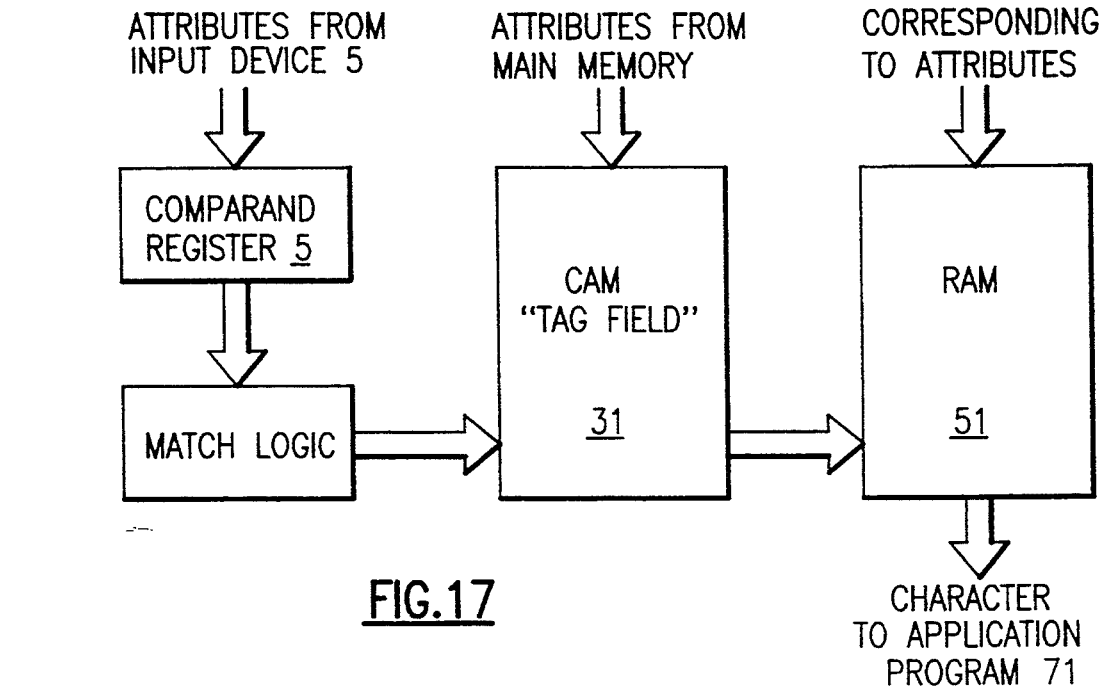
FIG.17

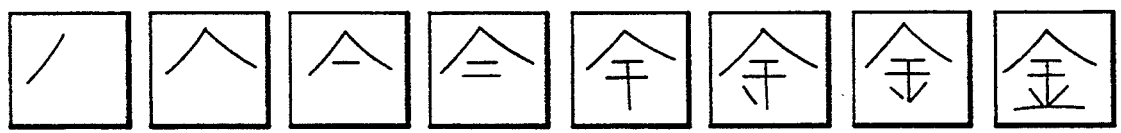
FIG.12
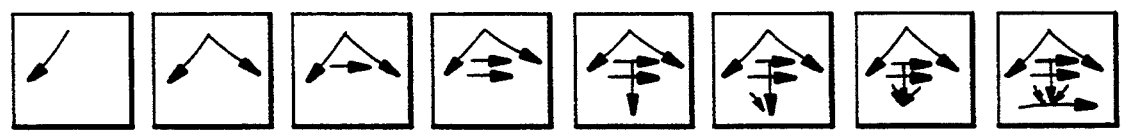
FIG.13
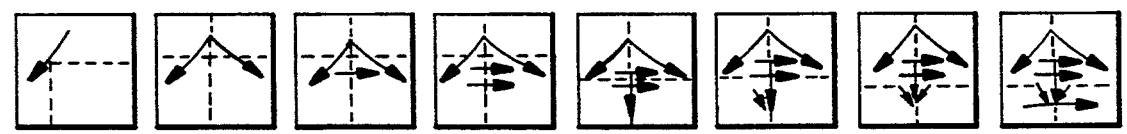
FIG.14
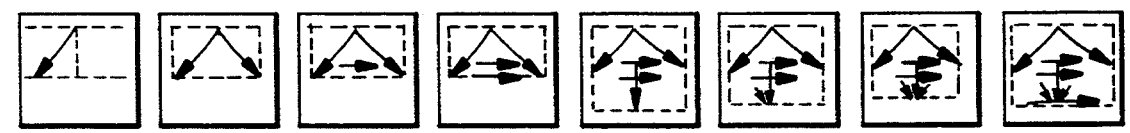
FIG.15
FIG.16
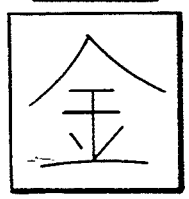

METHOD AND APPARATUS FOR ON-LINE, REAL TIME RECOGNITION OF STROKED HAND-DRAWN CHARACTERS

FIELD OF THE INVENTION

The invention relates to a real time user input device and method of inputting user data into a massively parallel processor. The system utilizes a content addressable memory, also know as an associative memory or, simply, as a CAM. CAM's are characterized by a tag field, typically corresponding to an address in main random access memory, and a data field, containing the contents of the addressed memory location. According to the invention described herein, the TAG field contents are attributes, as strokes, stroke locations, stroke directions, stroke lengths, curves, start points, and stop points, of an object, as an alpha-numeric object, and the data field contents are the objects, i.e., the alphanumeric objects, having the said attributes. The tag fields are searched in parallel, and the object field, i.e., the data field, contents are the input to an application program running elsewhere.

BACKGROUND OF THE INVENTION

Louis P. Butler and John E. Meisenbacher, "Content Adddressable Memory for Electronic Warfare Sensor Signature Identification," 9th Digital Avionics Systems Conference, Oct. 15-18, 1990, Virginia Beach, Va., describes the use of sensor signatures in a CAM tag field to address sensor threats having the address stored in the CAM data field.

G. Eichmann and T. Kasparis, "Pattern Classification Using A Linear Associative Memory," *Pattern Recognition*, Volume 22, No. 6, pp. 733-740 (1989) describes pattern recognition using a linear associative memory.

Charles K. Toth and Toni Schenck, "Pattern Recognition With Parallel Associative Memory," *Proceedings SPIE-International Soc. Opt. Engrs.*, Vol. 1395, part 1, 1990, pp. 558-563 describes a nearest neighbor algorithm for photogrammetric pattern matching.

Michiel van de'Panne, Marcel A. LeBlanc, and Zvonoko G. Vranesic, "MACHAM: A Best Match Content Addressable Memory," *IEEE Conf. on Commun. Comput. Signal Process.* Jun. 1-2, 1989, pp. 612-615 describes a best match method of pattern recognition using a CAM.

These papers do not describe machine recognition of hand drawn, user input characters, symbols, and gestures, especially in a small portable computer, using an associative memory, in a parallel processor chip having multi-way distributed processing.

OBJECTS OF THE INVENTION

It is one object of the invention to provide a method and apparatus for using associative memory for on-line character recognition.

It is a further object of the invention to provide on line, real time character recognition of handwriting in a distributed processor having a multi-way associative memory.

SUMMARY OF THE INVENTION

These and other objects are obtained by the method and apparatus of the invention described below. According to the method and apparatus of the invention there is provided a method of using associative memory, that is, CAM, in an algorithm for online character recognition in real time. This is accomplished, in a preferred embodiment of the invention, using a parallel processor having distributed processing elements with multi-way associative memory.

According to the method of the invention an alphanumeric input, such as a Roman alphanumeric input, a Cyrillic alphanumeric input, an Arabic number, an Arabic or Hebrew letter, or a pictograph, as a Japanese kanji character or a Chinese ideographic symbol is input to a text processing or word processing program. This is accomplished in a computer having relative motion, or, similarly, relative position sensing input means and content addressable memory means.

The content addressable memory is one having a tag field for input attributes and a data field for each of the output objects, as characters or operands.

The process begins by determining when the relative motion, or, similarly, relative position sensing input device is active. This is an iterative process, continued until activity is sensed. Once activity is sensed, it is possible to sense one of more basic attributes, such as motion or position, of the active relative motion sensing input means.

The accumulated sensed data is used to define a meta attribute of the sensed input. Exemplary meta attributes include one or more of turns, weighted input center, and the numbers, locations, and directions of strokes of the character.

The sensed attributes and meta attributes are next formed into a multi-bit input object attribute vector or word. This vector or word is stored in a comparand register.

The multi-bit input attribute vector or word is compared, preferably as frequently as at each iteration, to the recognition pattern entries, i.e., the tag field entries, in the TAG field of content addressable memory.

The output of the content addressable memory, in the form of an output object, is the contents of the content addressable memory data field having a recognition pattern tag field entry, i.e. a recognition pattern vector or meta-attribute vector, most closely corresponding to the multi-bit input object attribute word or vector stored in the comparand register.

The system for translating position and motion input to alphanumeric input to an application program has a relative motion, or, similarly, relative position sensing input device, as a stylus, a mouse, a trackball, a pointer, a pen, or even the user's finger. The system may further include motion analysis capability.

The motion sensing input device includes the capability for determining when the device is active, i.e., when it is in motion. This can be displayed to the user by a cursor icon, a tail or trail, a pointer icon, an arrow icon, ray trace, or other visual indicia.

When the motion sensing input device is active, the movement of the device, as a mouse, track ball, touch pen, or touch screen, has relative motion corresponding to the basic attributes, i.e., motion and position, of the active relative motion relative position sensing input device. This motion, in the form of convex and concave curves, left and right curves, horizontal, vertical, and diagonal lines, and relative dimensions thereof, constitute the basic attributes of the alphanumeric input.

The meta attributes of the sensed input include the numbers of locations of the turns and curves, the weighted center of the input, and the number, locations, and directions of the strokes. The meta attributes are converted into signals, stored in the system, and formed into a multi-bit input object attribute word or vector of the sensed basic attributes and defined meta attributes of the sensed input for storage in the comparand vector of the CAM.

The system includes a content addressable memory, also referred to as an associative memory and as an associative memory. The content addressable memory is typically a CMOS VLSI having lines, fields, or data length registers, divided into tag fields for storing attributes to be searched for, data fields for objects determined by the search of the TAG fields, a comparand field for temporarily storing the user generated meta attribute data, and comparator circuitry for concurrently comparing a multi-bit input object attribute word stored in the comparand register to the stored recognition pattern tag field entry meta-attributes.

The system further includes a subsystem for outputting a selected output object from the content addressable memory data field. This output object is the contents of the content addressable memory data field having a recognition pattern tag field vector or word entry most closely corresponding to the multi-bit input object attribute word or vector stored in the comparator register.

In a preferred embodiment of the invention the system is part of a multiprocessor having a plurality of processor memory elements and a relative motion, or, similarly, relative position sensing input subsystem.

THE FIGURES

The invention may be understood by reference to the Figures appended hereto.

FIGS. 5a-5e show the dynamic computation of the element size of the upper case "A".

FIGS. 6a-6e show an alternative method of inputting the letter "A".

FIGS. 7a-7b show a method of inputting the letter "C".

FIGS. 8a-8f show a method of inputting the letter "B".

FIGS. 9a-9g show a method of inputting the letter "M".

FIGS. 10a-10f show a method of inputting the letter "K".

FIGS. 12 through 16 show a method of inputting the Japanese Kanji ideograph "Kan" and recovering the Japanese block figure "Kan."

FIG. 17 shows one hypothetical embodiment of a simplified Associative Memory.

DETAILED DESCRIPTION OF THE INVENTION

According to the method of the invention an alphanumeric input, such as a Roman alphanumeric input, a Cyrillic alphanumeric input, an Arabic number, an Arabic or Hebrew letter, or a pictograph, as a Japanese kanji character or a Chinese ideographic symbol is input to a text processing or word processing program. This is accomplished in a computer having relative motion, or, similarly, relative position sensing input means and content addressable memory means.

The content addressable memory is one having a comperand register for the user input attrbutes to be compared, tag field for storing the pre-programmed attributes compared against the comparand entry, and a data field for each object corresponding to a preprogrammed set of attributes.

Figure 23:
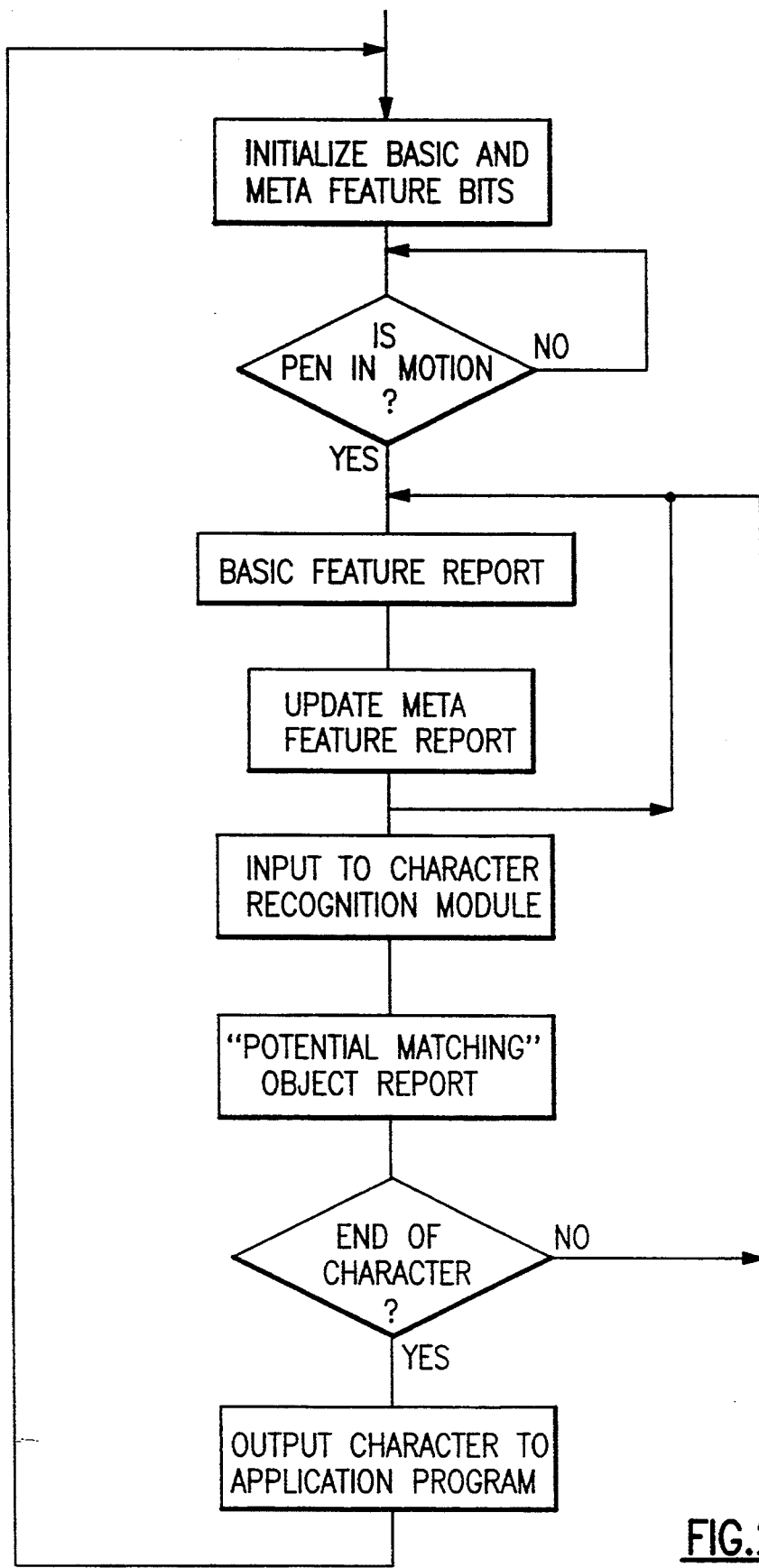
FIG. 23 shows an overall flow chart of the method of the invention.

As shown in the flow chart of FIG. 23, the process begins by determining when the relative motion, or, similarly, relative position sensing input device is active. This is an iterative process, continued until activity is sensed. Once activity is sensed, it is possible to sense one of more basic attributes, such as motion or position, of the active relative motion sensing input means.

The accumulated sensed data or a subset thereof is used to define one or more meta attributes of the sensed input. Exemplary meta attributes includes the number, location, and direction of turns, weighted input center, and the number, locations, and directions of strokes of the character.

The sensed attributes, including subsets thereof, are combined into meta attributes. The set of meta-attributes are next formed into a multi-bit input object attribute vector or word. The attribute vector or word is stored in a comparand register.

The stored multi-bit input attribute vector or word is updated and compared, both preferably as frequently as at each iteration, to the recognition pattern entries, i.e., the tag field entries, in the content addressable memory. When a match is found between the comparand entry and a TAG field entry, a match indicator is set high. The output of the content addressable memory, in the form of an output object, is the operand or data represented by the contents of the content addressable memory data field having a recognition pattern tag field entry most closely corresponding to the multi-bit input object attribute word in the comparand register.

The system for translating position and motion input to alphanumeric input to an application program has a relative motion, or, similarly, relative position sensing input device, as a mouse, a trackball, a pointer, a stylus, a pen, or even the user's finger. The system may further include motion analysis capability.

The motion sensing input device includes the capability for determining when the device is active, i.e., when it is in motion. This can be demonstrated to the user by a cursor, pointer, arrow, ray trace, or other visual indicia.

When the motion sensing input device is active, the movement of the device, as a mouse, track ball, touch pen, or touch screen, has relative motion corresponding to the basic attributes, i.e., motion and position, of the active relative motion relative position sensing input device.

This motion, in the form of convex and concave curves, left and right curves, horizontal, vertical, and diagonal lines, and relative dimensions thereof, constitute the attributes of the alphanumeric input. The meta attributes of the sensed input include the numbers and locations of the turns and curves, the weighted center of the input, and the number, locations, and directions of the strokes. The meta attributes are converted into signals and stored in the system, and formed into a multi-bit input object attribute word or vector of the sensed basic attributes and defined meta attributes of the sensed input. This word or vector is the comparand word or vector, stored in the comparand register.

MATCHING OBJECT ATTRIBUTES TO OBJECTS

Figure 1:
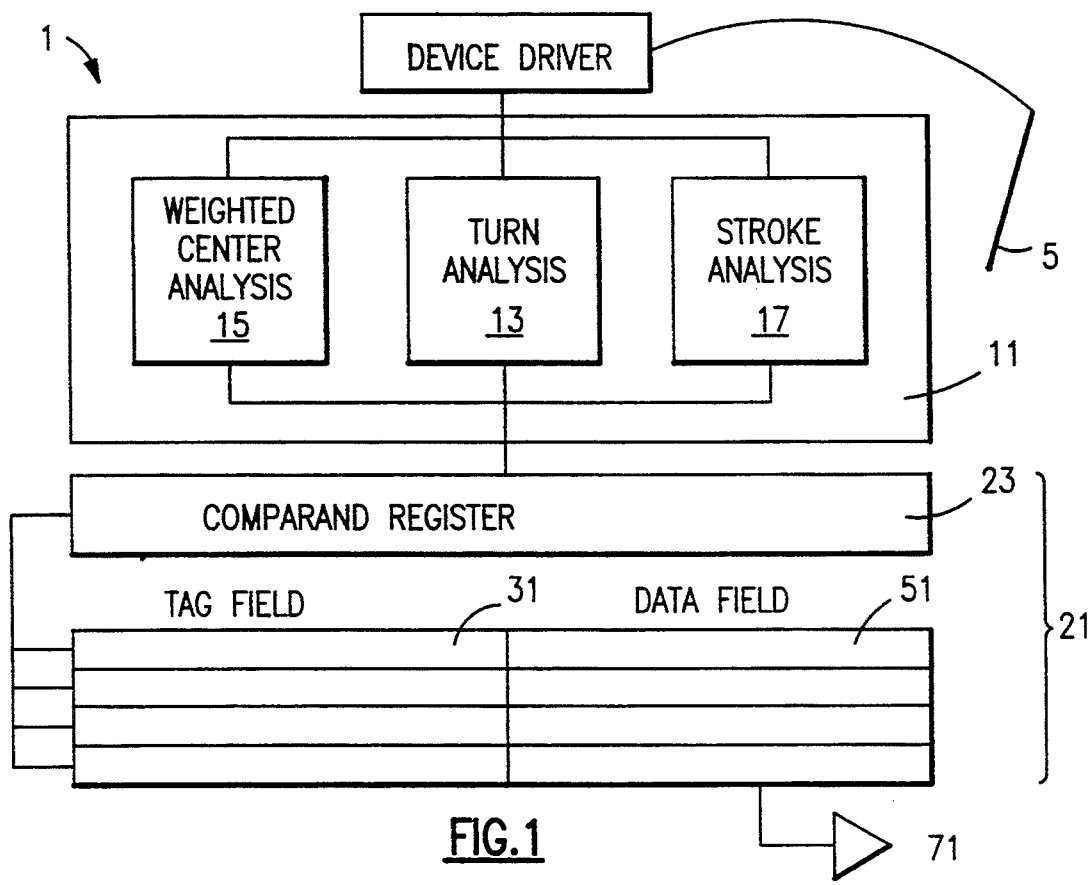
FIG. 1 is a system overview, showing the processing module, with an input device, mption analysis means, CAM, comparand register, TAG fields, data fields, and application program.

The system has the general structure shown in FIG. 1. The processing module 1 has an input device 5. The input device 5 can be a pointer, a mouse, a track ball, a pen, or a touch sensitive screen. The invention is illustrated with a pen type pointer 5. The system 1 further includes motion analysis means 11, including turn analysis means 13, weighted center analysis means 15 and stroke analysis means 17. The outputs of these analysis means 11, 13, 15, and 17 are input to comperand register 23 of the CAM 21, referred to in FIG. 1 as an "Object Analyzer/Recognizer" 23 in an iterative process which continues until the next character has been started. The contents of the Comperand Register 23 are compared to the TAG fields 31 of the CAM 21. The object stored in the data field 51 and identified thereby is reported to the Application Program 71.

The actual movements of input means 5 are the basic features or attributes of the object. The analyzed features are the "meta features" or "meta-attributes" of the object, analyzed using the turn analysis means 13, the weighted center analysis 15, and the stroke analysis 17. Both the basic attributes, and the meta attributes or meta-features are the attributes tabulated in the tag field 31 of the Associative memory 21.

Figures 2A, 2B, 2C, 2D, 2E:
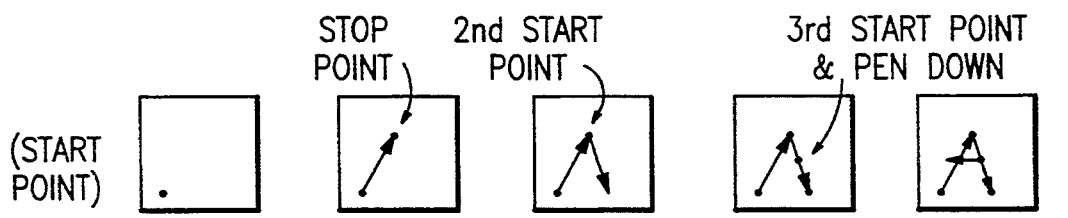
FIGS. 2a-2e show a five frame representation for drawing the upper case letter "A".

FIG. 2 shows five frames of the pen strokes for writing a block capital "A." Starting from a point in the lower left hand corner (Frame a), a diagonal line is drawn towards the upper right to a stop point (Frame b), and then from this second stop point downward towards the lower right corner (Frame c) where the pen is raised and repositioned (Frame d) to make the horizontal cross member (Frame e).

Figures 3A, 3B, 3C, 3D, 3E:
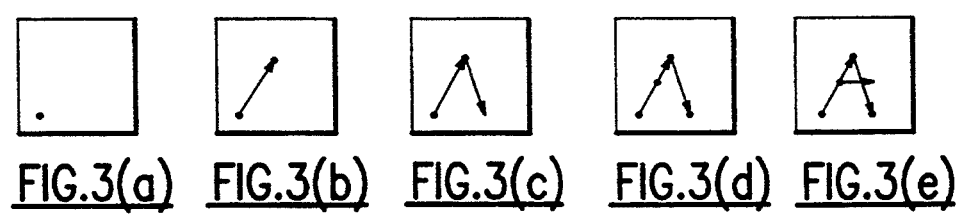
FIGS. 3a-3e show the movements of FIG. 2 tracked by the Motion Analysis Means of FIG. 1.

FIG. 3 shows the movements tracked and analyzed by the Motion Analysis Means 11 of FIG. 1, including the Turn Analysis Means 13 and the Stroke Analysis Means 15. Thus, frame a shows the pen down at the start point, frame b shows tracking XY motion (Theta=0 to 90 degrees, first quadrant) from the start point to the first stop point. Frame c of FIG. 3 shows the XY tracking from the first stop point to the second stop point (Theta=0 to minus 90 degrees, fourth quadrant) and a "pen up" movement. Frame d shows the second pen down movement, while frame e shows the horizontal movement (Theta=approximately 180 degrees).

Figures 4A, 4B, 4C, 4D, 4E:
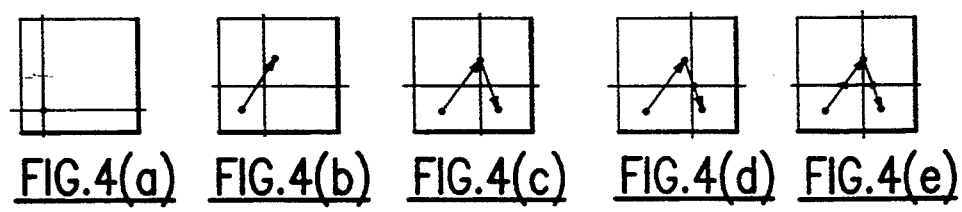
FIGS. 4a-4e show the dynamic computation of the center of the upper case "A".
Figure 11A:
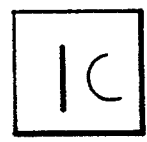
FIGS. 11a-11e show a method of inputting the cursive Hebrew letter "Aleph" and recovering the non-systematic upper case Hebrew letter "Aleph".
Figure 11B:
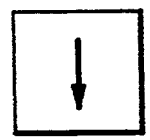
Figure 11C:
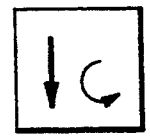
Figure 11D:
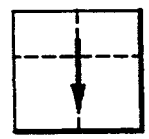
Figure 11E:
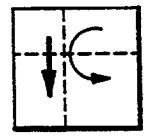
Figure 11F:
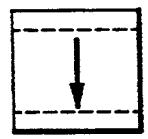
Figure 11G:
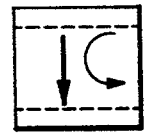
Figure 11H:

FIG. 4 shows, in frames a through e, the dynamic computation of the center of the letter, utilizing the weighted center analysis means 17 of FIG. 1. Frames a through e of FIG. 5 shows the dynamic computation of the object size.

The results of the motion analysis, including turn analysis, weighted center analysis, stroke analysis, and dynamic size analysis, are the meta-features or meta-attributes stored in the comparand register for comparison to the contents of the tag field of the associative memory 21.

FIG. 6 shows an alternative way of drawing the upper case A, where a diagonal line is drawn from the lower right hand corner of the diagonal to a start point on the 0 to 90 degree (first quadrant) diagonal. The attributes of this method of drawing the upper case letter A have the same object, but different attributes, from the method shown in FIGS. 2 through 5.

FIG. 7 shows the start point, turn, and stop point of the letter C, while FIG. 8 shows the start point, stop points, and turn for the upper case letter B. FIG. 9 shows the development of the meta-attributes of the upper case M, with calculation of the weighted center. FIG. 10 shows the development of the upper case K.

FIG. 11 shows the use of the system where the letter system is non-systematic. That is, in a non-systematic system, the cursive form of a letter may not suggest the block form, as Hebrew. In FIG. 11, the cursive form of the Hebrew letter aleph is drawn in frames a through c. The object is the block letter aleph, shown in block d.

FIG. 12 shows in Frames a through h, the eight stroke sequence for the Japanese Kanji character Kan ("Gold"). FIG. 13 shows the start points, the stop points, and the pen up and pen down points for the Japanese Kanji figure "Kan." FIG. 14 shows the calculation of the dynamic center for Kan, while FIG. 15 shows the determination of the object size for Kan. FIG. 16 shows the object, Kan.

The basic features or basic attributes include:
Pen: Up/down; X, Y.
Motion: Start (X,Y), Stop (X,Y), Direction (Length, angle).
Pause: X, Y, duration.
The meta features and their measures are:
Stroke: Start X, Y; Stop X, Y; Orientation.
Turn: New Direction.
Weighted Center: X, Y.
Size: Size.

PARALLEL PROCESS SYSTEM

While the content addressable memory of the invention can be utilized with various parallel processor systems, one preferred system is the massively parallel processor having the architecture described herein. The massively parallel processor is an MIMD (Multiple Instruction Multiple Data) massively parallel processor. Typical MIMD processors of the prior art are characterized by a fast microprocessor chip set surrounded and supported by a plurality of chips that provide large amounts of storage and a memory hierarchy. Inter-node communications is provided by a complex set of inter-node communications processors. In the prior art parallel processors each node ran a relatively complex operating system kernel, and intra-application, internode communications was provided by a standard set of message passing functions. Shared and distributed memory were supported by an extensive memory management logic system.

By way of contrast, the massively parallel processor described herein has one type of chip, this chip is replicated as the basic node. The chip includes all of the Central Processor Unit (CPU) logic, the memory, and the internode communications ports.

Figure 24:
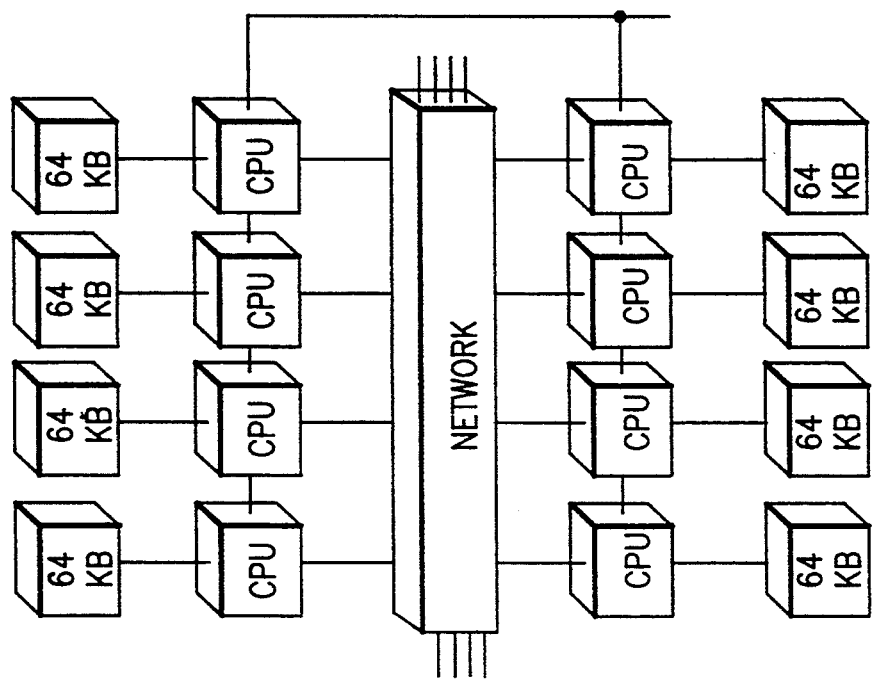
FIG. 24 shows a schematic overview of a parallel processor with multiple processor-memory elements useful in the practice of the invention described herein.

One such massively parallel processor chip is the International Business Machines, Inc., EXECUBE TM. This chip, shown generally in FIG. 24, contains a plurality of CPU's and memory, for example eight CPU's and 64 KB of memory per processor. The chip is designed to be run in either a MIMD or a SIMD mode. In the MIMD mode each CPU obtains its own instructions from its own memory, while in the SIMD mode the instructions are broadcast from outside the chip directly into each individual CPU's instruction register. A further point is that arbitrary sets of CPU's can run in either mode simultaneously, with a special class of instructions managing the transition of one or more individual CPU's between MIMD and SIMD modes.

Each CPU also includes four full duplex parallel communications ports. Three of these full duplex communications ports go to the other CPU's on the same chip, while the fourth communications port communicates off-chip. This provides eight externally accessible chip ports. These ports can be wired directly to other ports on the same chip or to ports on other chips, all without support logic. Inter-chip communications is accomplished through this fourth port without off chip logic.

The resulting architecture provides a massively parallel processor in which 100 percent of the chips are performing useful computations, and over sixty percent of the contacts leaving an individual chip are directly allocated for data communications with other chips.

The integrated circuit chips are memory rich, with eight separate 64 KB memory subsystems, each connected to a 16 bit CPU. The CPU's have a high performance general register file, a 16 bit data flow that can support up to 64 bit arithmetic operations, and hardwired control logic. Performance of an individual processor is at an average of approximately 5 machine cycles per instruction. The memory is kept busy approximately 80 percent of the time.

In the massively parallel processor useful in the method of the invention, various communications protocols can be implemented. These include:

"Direct transfer" where each CPU can perform direct I/O to and from its port as a result of instruction execution.

"Packet switched" where messages coming into a node can be "DMAed" (transferred by Direct Memory Access) into the owning CPU's memory, with interrupts occurring when the buffer has reached a certain fraction of fill, at the end of the message, or on the occurrence of one or more of several other events.

"Circuit switched" where a CPU can throw an internal switch which directs data into and through the CPU and out of another port to another CPU. Even while such transfers are in process, there is no impact on the program running in the CPU, nor on communications in the other two ports. This mode allows transfer from an external CPU, to and through a first and even a second and third or more CPU's, to an ultimate target CPU, without registers or pipelining, and without intermediate handshakes.

The programmability of the I/O allows a rich menu of communication options between the content addressable memory and the CPU or CPU's running the application.

ASSOCIATIVE MEMORY

The system includes a content addressable memory, also referred to as an associative memory or as an associative memory. The content addressable memory is typically a CMOS VLSI as in the above described massively parallel processor. A CAM is divided into a plurality of functions including a comparand register, comparators, tag fields, data fields, and circuitry for concurrently comparing a multi-bit input object attribute word to the recognition pattern tag field entries.

The CAM system further includes an I/O subsystem for outputting an output object from the data field of the content addressable memory to an application program running in another CPU of the parallel processor. This output object is the contents of the content addressable memory data field having a recognition pattern tag field entry most closely corresponding to the multi-bit input object attribute word stored in the comperand register.

Associative memory, also known as content addressable memory, is parallel searchable memory. Historically, content associative memories were small, fast memory, parallel searchable memories, located close to a CPU. In this regard CAM memory and its use is driven by two simple axioms, one of hardware design and one of software design.

Hardware Axiom: "Smaller Is Faster." A smaller memory is a faster memory. This is because a smaller memory has smaller propagation delays than a larger memory. Furthermore, for the same technology (transistor type and feature size), smaller memories are faster then larger memories. This holds true for the IBM EXECUBE TM multi (processor-memory element) chip described hereinabove.

Software Axiom: "Locality of Reference." The principle of Locality of Reference says that the most recently used data is most likely to be accessed again within a small number of CPU operations. Thus, favoring accesses to the most recently accessed data will improve performance. Input characters are the most heavily used data objects in the systems described herein.

CAM memory in the IBM EXECUBE TM multi (processor-memory element) chip exploits these two axioms by providing a small, high speed memory close to and identified with a CPU. The individual memory lines of the CAM memory are divided into two fields, a tag field, and a data field.

In the invention disclosed herein simultaneous search of the TAG fields, i.e., by comparison of the user input generated attributes and meta attributes derived therefrom, in the comparand register 23 with the pre-programmed attributes and meta-attributes stored in the TAG fields 31 is the role of the content addressable memory or associative memory 21. Each row in the CAM 21 contains the attributes or characteristics of an object. This is stored in the TAG field 31 of the CAM 21 or associative memory RAM. The data field 51 contains the data to be transferred to the application field, for example, the ASCII code of a letter or number, or the code for executing an application program operand, as addition, subtraction, multiplication, division, exponentiation, root extraction. All of the CAM blocks are searched in parallel. When a match is found the match line is set high.

As the attributes of an object are collected and updated in the comparand register 23, it is necessary to examine the TAG field 31 of each and every CAM line to determine whether a given memory content constitutes a hit. In order to maximize the performance of the CAM memory 21, all of the TAG fields 31 are scanned simultaneously.

The incoming object attributes from the I/O device, processor, or pre-processor are bussed to N comparators (a unique comparator for each CAM line). If the CAM contents are managed to avoid duplication, the incoming object attributes will match at most one TAG. If there is a match or hit, the match line or hit line is pulled high, and the contents of the data field of the CAM line are read onto the output data bus of the RAM or written from the data bus.

Consider an object, e.g., ASCII code 00001100, with attributes 123. If this object 00001100 is duplicated into CAM, one CAM line will have the tag field "123", i.e.

| 123 | ASCII Character 00001100 |
| --- | --- |

An entry of object attributes 123 by the input device 5 will lead to a match at the comparator associated with this CAM line, driving the MATCH line high, and asserting the corresponding object, 00001100, of the attributes, <123>, onto the data output (Read) bus.

This is illustrated in FIG. 1 where the procedure implemented with the input device 5 supplying a set of attributes to the Comparand Register 23. The attributes in the Comparand Register 23 are compared, through the comparators, to the descriptors in the TAG field 31 (the CAM entries) by the logic. If a Match or Hit is found, the contents of the CAM line in the data RAM 51 are asserted to the appropriate register in the CPU.

Each location in CAM, i.e., each "CAM line" is in two parts, a tag field 31, and a data contents field 51. This is as shown below,

| TAG FIELD | CONTENTS FIELD |
| --- | --- |
| (The attributes of the object) | (The object having the attributes.) |

Figure 18:
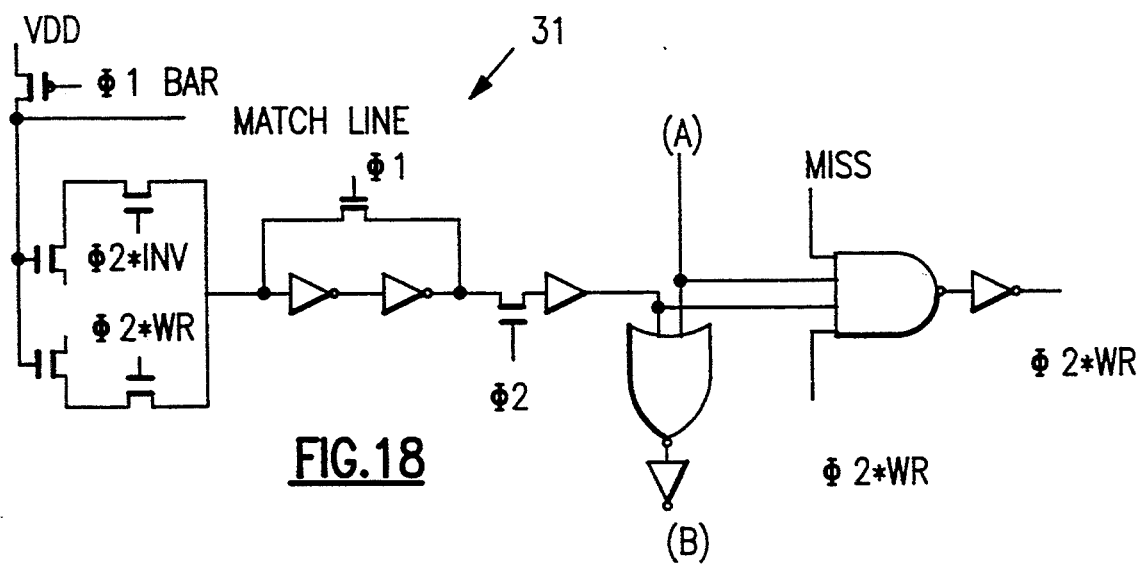
FIG. 18 shows another hypothetical embodiment of another simplified Associative Memory.

A simple Content Addressable Memory is illustrated in FIGS. 17 and 18. The basic cell design used for both the TAG content addressable memory (CAM) and for the RAM is, in the simplest case, a basic static memory cell. The simplified RAM cell is shown with a single bit line (bus) for both read and write accesses. The CAM cell is also illustrated with a match line. The match line is precharged, and discharges if the contents do not match the bit line (bus) against which it is compared, that is, if the CAM TAG field contents do not match the Comparand Register contents. The RAM and CAM are discussed below.

RANDOM ACCESS MEMORY (RAM)

The CAM-RAM contains the data field of the code word, i.e., the ASCII characters, to be written to the application program running in the CPU. This is illustrated in a hypothetical 8×8 RAM cell shown in FIGS. 19 and 20.

In the simplified, hypothetical RAM used for illustration purposes, the following steps are taken for the RAM operation:

Read Operation: When the RAM driver is on (as described below with respect to the CAM), the contents of the RAM activated by the driver are read to the multiplexer, MUX. The MUX will select a portion of the output and route to the CPU.

Write Operation: CPU will latch data at the input of the RAM. This can be for or character attributes versus object data. As the RAM driver is activated via the CAM, the data is written into the RAM cell. If there is a MISS signal, nothing will be written into RAM.

Figure 19:
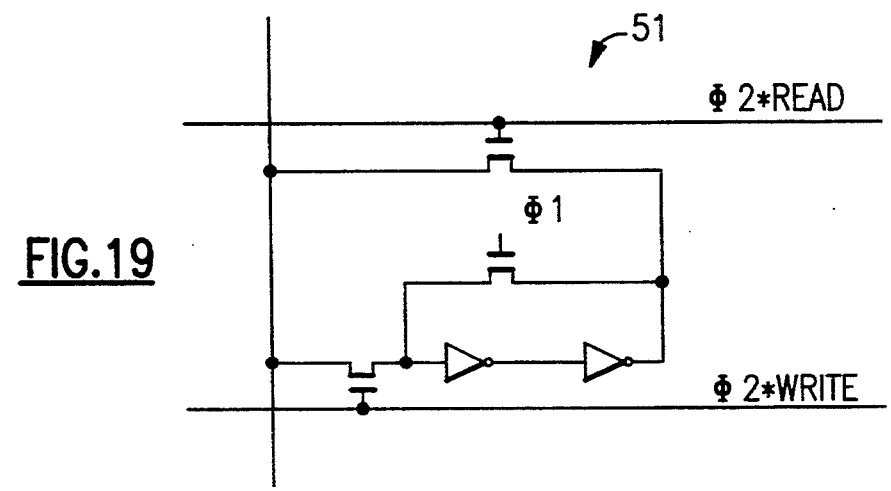
FIG. 19 shows one hypothetical embodiment of a simplified RAM cell.
Figure 20:
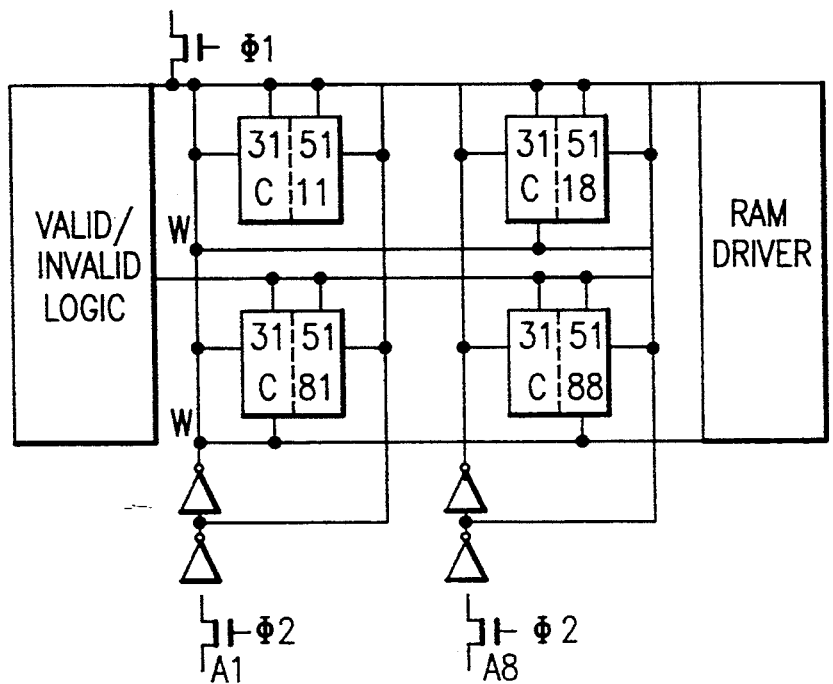
FIG. 20 shows another hypothetical embodiment of a simplified RAM cell.

A simplified static RAM cell layout is shown in FIG. 19.

The RAM driver circuitry, shown in FIG. 19, utilizes the Match line and the Read and Write lines to activate the RAM. If the Match line is on and the Read control signal is activated, the Read from RAM will take place. If, on the other hand, the Write signal is on, a Write to RAM takes place. When there is no match, the CPU will activate the Write to RAM and CAM signals. In this instance, the Valid/Invalid circuitry will activate the Address Select Line enabling the Write to CAM and RAM.

The timing sequence used in the RAM involves Clock2 ($\Phi 2$). The period of Clock2 ($\Phi 2$) is determined by the worst case RAM operation (i.e. the operation that consumes the longest time).

CONTENT ACCESSIBLE MEMORY (CAM)

The CAM data field 51 is an integral part of the CAM 21 memory. It is used to store the object attribute code field of the object code word (i.e. ASCII character). As described above the I/O means will query the CAM TAG field 31 through the Comparand Register 23 and the Comparators. The memory CPU, in its search for valid data, will follow the following steps:

Read Operation: In its query of valid data, the CPU will latch the comparator contents, i.e., the input meta-attributes to the CAM TAG field comparators. The value of the latched attributes is compared with the stored attributes in the Comparand Register. A MATCH will occur if the latched attributes are equal to the stored attributes, which then enables the data, stored in RAM, to be read to or written from the application program CPU. Normally a successful read or write, in CAM, should take place within 1 clock cycle.

Write Operation: Similar to the READ operation, an attribute code is latched and compared with attribute codes stored in the CAM TAG fields. If a match occurs, the data from the CPU will be written in CAM-RAM. If a miss occurs, nothing will be written to RAM on that clock cycle. The CPU, realizing that miss has occurred, will force a write to CAM and RAM.

The essence of a simplified CAM (i.e. the basic CAM cell) is shown in FIG. 18. The cell consists of a simple 1 input −1 output flip-flop, which is the memory element, and a match logic. The match logic will pull down a previously precharged match line when the content of the cell does not match with the latched bit. The match logic utilizes transistors T1, T2, T3 and T4 as shown in the basic cell layout.

The timing sequence used in the CAM is as follows:

At Clock1 ($\Phi 1$) the match line is precharged and address is latched in the flip flop at the address input.

At Clock2 ($\Phi 2$) the latched address is enabled on the address bus and compared with stored address. If there is a match, the precharged line should stay charged and will contribute in selecting the RAM data. If there is no match, the precharged line will discharge to ground through one of the discharge path surrendering the CAM from driving the RAM.

Figure 21:
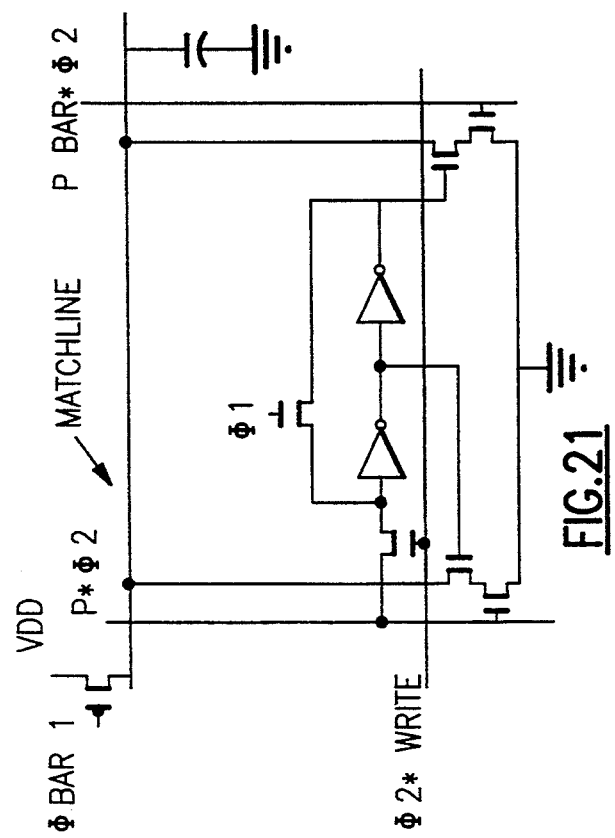
FIG. 21 shows a simplified, hypothetical Associative Memory circuit.

The circuit design for the hypothetical CAM cell (the content addressable or associative memory) is shown in FIG. 21.

MULTIPLEXERS

For a write operation, the RAM outputs a whole line of data. For the simplified CAM memory used solely to illustrate the principles of the invention, a line is N bits of data; m words of n bits each. Only one word (n bits) should be output to the CPU. The MUX/decoder must decode the word-address bits to select the correct word, and multiplex the appropriate data bits out. There are actually two multiplexers, one for each bit of the data word output.

For two bit words the word address consists of the two least significant bits, $a_1$ and $a_0$.

CLOCK APPROACH

Inputs to the CAM are the clock signals, chip select, and the object attributes (which generates a match/no match, which is then sent back to the CPU for retrieval or CAM miss).

Figure 22:
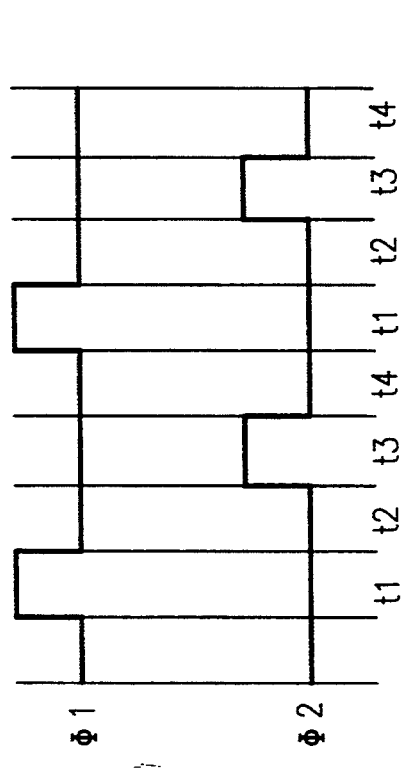
FIG. 22 shows a simplified, hypothetical match line structure.

In FIG. 22 T1 is the MATCH line precharge, the feedback loops in the memory cells are established, and the inputs from the CPU are gated.

T3 is the RAM to CAM read/write, the MUX precharge, and evaluation of the FULL and MISS lines.

T4 is the MUX evaluation, and the data output lines are set.

In T1 of the subsequent cycle the data outputs remain valid.

While the invention has been described with respect to certain preferred embodiments and exemplifications thereof, it is not intended to limit the scopes of the invention thereby, but solely by the claims appended hereto.

I claim:

1. In a computer means for translating position and motion input to alphanumeric output comprising:
    a. relative motion and/or relative position sensing input means comprising:
        i. means for determining when said relative motion and/or relative position sensing input means is active;
        ii. means for sensing basic motion and/or position attributes of the active relative motion and/or relative position sensing input means; and
        iii. means for defining a meta attribute of the sensed input, said meta attribute chosen from the group consisting of one or more of turns, weighted input center, and strokes thereof; and
    the improvement wherein said computer means comprises parallel processor computer means, said parallel processor computer means having a plurality of processor memory elements, at least a first one of said processor memory elements comprising:
    b. multi-way associative content addressable memory means, said multi-way associative content addressable memory means having
        i. a comparand register for storing and iteratively updating an input object attribute word;
        ii. recognition pattern tag field means for input attribute words;
        iii. character data field means for output attributes;
        iv. means for concurrently comparing a multi-bit input object attribute word in the comparand register to a plurality of recognition pattern tag field entries in the content addressable memory; and
        iv. means for outputting from the content addressable memory as an output object the contents of the content addressable memory character data field having a recognition pattern tag field entry most closely corresponding to the multi-bit input object attribute word; and
    wherein said relative motion and/or relative position sensing input means further comprises:
        iv. means for forming a multi-bit input object attribute word of the sensed basic attributes and defined meta attributes of the sensed input;
    said relative motion and/or relative position sensing input means and said content addressable memory means maps motion and position data to alphanumeric data; and
    wherein at least another one of said processor memory elements is in communication with said first one of the processor memory elements for receiving output therefrom.

2. The computer means of claim 1 wherein the output object is an alphanumeric character.

3. The computer means of claim 2 wherein the output object is a non-systematic character.

4. The computer means of claim 2 wherein the output object is input to a word processing application program.

* * * * *